United States Patent [19]

Diebolt et al.

[11] Patent Number: 4,929,130
[45] Date of Patent: May 29, 1990

[54] GRINDING WHEEL GUARD APPARATUS

[75] Inventors: Richard A. Diebolt, Wethersfield; Stephen Kidd, East Hampton; Donald E. Rivers, Jr., Tolland, all of Conn.

[73] Assignee: United Technologies Corporation, Hartford, Conn.

[21] Appl. No.: 372,725

[22] Filed: Jun. 28, 1989

[51] Int. Cl.⁵ ............................................ B23Q 11/10
[52] U.S. Cl. .................................... 409/136; 51/267; 408/56; 408/60; 29/DIG. 87; 29/DIG. 91
[58] Field of Search ............... 51/266, 267, 356; 409/135, 136; 408/56, 59, 60, 61; 29/DIG. 50, DIG. 54, DIG. 63, DIG. 64, DIG. 68, DIG. 87, DIG. 91, DIG. 92, DIG. 86

[56] References Cited
U.S. PATENT DOCUMENTS

| | | | |
|---|---|---|---|
| 2,534,941 | 12/1950 | Baldenhofer | 29/DIG. 91 |
| 4,619,081 | 10/1986 | Lipanski | 51/267 |
| 4,679,970 | 7/1987 | Lohneis et al. | 409/135 |
| 4,822,218 | 4/1989 | Satoh | 51/236 |

Primary Examiner—Roscoe V. Parker
Attorney, Agent, or Firm—Edward L. Kochey, Jr.

[57] ABSTRACT

A tool holder (32) includes a rotary portion (36) securable in a spindle (20) of a machining center (10). A pumped flow of primary coolant (16) is delivered through spindle (20) and rotary portion (36). A pumped flow of secondary coolant (22) is delivered to a static connection (26) and through the static portion (34) of the tool holder. A tool guard assembly (42) secured to static portion (34) surrounds an installed superabrasive grinding wheel (66). It also includes flow paths (50, 52, 98; 62, 68, 82 84) and nozzles (70, 80, 86, 94) to direct coolant to pre-established directions. The tool may be installed automatically in a multipurpose machining center with no additional set up time required.

17 Claims, 3 Drawing Sheets

GRINDING WHEEL GUARD APPARATUS

TECHNICAL FIELD

The invention relates to machining tools and in particular to an easily set up grinding apparatus.

BACKGROUND OF THE INVENTION

A manufacture of sophisticated apparatus such as jet engines requires multiple sequential machining operations. Close tolerances must be maintained and it is of course important to efficiently carry out the overall machining process. At one time separate machines were used for drilling, milling, etc. each requiring a new setup as the workpiece was moved to the new machine.

Machining centers are now conventionally used which are computer controlled and where with one set up the tools are changed with instructions from a numerical control program that automatically changes tools and stores them within the machining center. The sequential operations are thereby more efficiently carried out and errors in the repeated setup process reduced.

Grinding, however, has continued to be a problem and conventionally is not included in the machining center. Conventional grinding wheels have grit discharged from the wheel which can clog up and interfere with the cooling and lubricating system of the machining center. The use of superabrasive wheels such as those of cubic boron nitrite with a steel core and one layer of grit secured to the core with nickel plate has avoided the grit problem, but difficulties in the setup remain. Such wheels require coolant and cleaning fluids to be delivered in proper amounts at proper locations. The process of setting up cooling and cleaning nozzles as dictated by research of super abrasive machining to maximize tool performance is very labor intensive and has not been in wide use in a production environment. This coupled with the hazard of hanging cooling lines has made this an impractical step. Accordingly, it has been conventional to remove the workpiece from the machining center to a separate grinding machine where there is not only a disruption in the flow of material, and a time loss in setting up the new machine, but variations in the setup may produce less than optimum results.

SUMMARY OF THE INVENTION

The machining center has a drive spindle and also a supply of high and low pressure coolant. The high pressure coolant passes through the center of the spindle while the low pressure coolant passes through a static connection.

Installed into the drive spindle is a tool holder apparatus with a static portion and a rotary portion. The high pressure flow path passes through the centerline of the spindle and rotary portion of the tool holder to the static portion of tool holder while the low pressure flow of coolant passes directly from the machining center into the static portion.

The superabrasive grinding wheel is installed with an arbor. Secured to the static tool holder portion is a guard assembly which includes an arcuate frame which will surround an installed grinding wheel. High and low pressure flowpaths in communication with the flowpaths of the static tool holder portion pass through the arcuate frame of the guard.

A cooling nozzle connected to the high pressure flowpath is located at one arcuate end of the frame and is directed tangential to the grinding wheel where it will intersect the workpiece. The flow passes in the same direction as the rotation of the grinding wheel and the coolant passes at substantially the same velocity as that of the grinding wheel. A windbreaker is located immediately before this coolant flow area to strip air from the grinding wheel thereby permitting the coolant to more securely contact the grinding wheel for local cooling thereof.

The low pressure flowpath through the guard discharges coolant against the grinding wheel at 30 degrees from the radial direction and pointing against the direction of rotation of the wheel.

An additional flood nozzle receives low pressure coolant and is adjustably oriented to flood the workpiece in the area of the grinding operation.

DESCRIPTION OF THE PREFERRED EMBODIMENT

Figure 4:
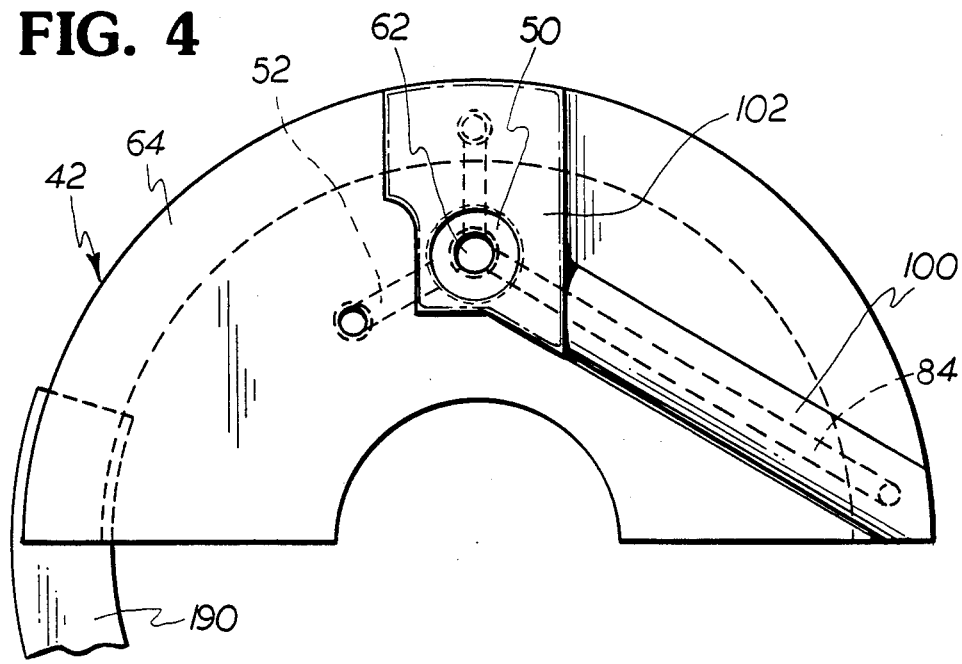
FIG. 4 is a view of the guard assembly through section 4—4 of FIG. 2.
Figure 1:
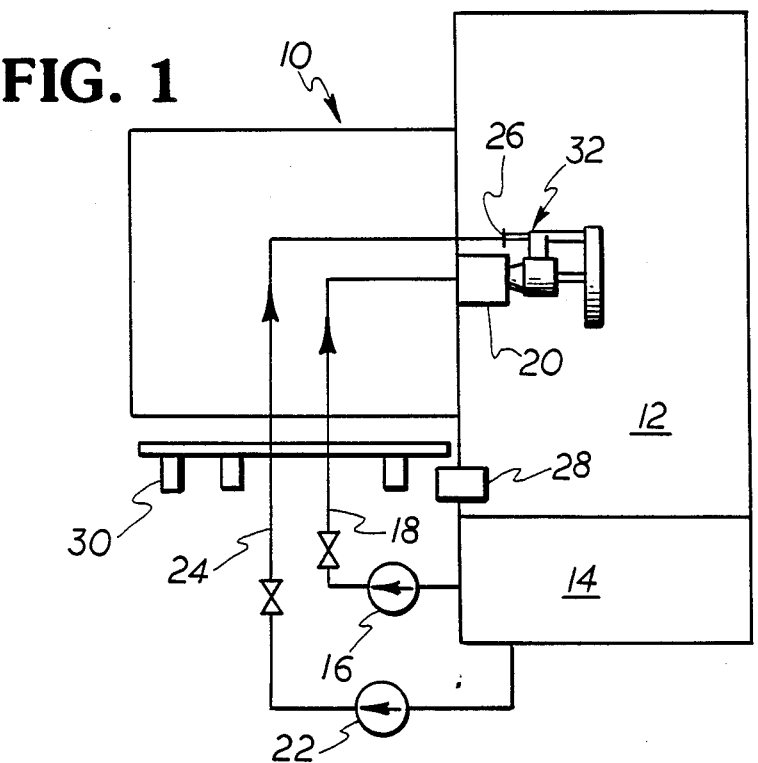
FIG. 1 is a schematic illustration of the machining center, tool holder, and guard assembly.

Machining center 10 includes bed 12 on which the workpiece to be machined is supported and manipulated. Sump 14 collects coolant and lubricant which may have been supplied to the machining operation and may include filters as required. A high pressure pump 16 circulates primary coolant in the form of water soluble oil at a pressure of 1400 kilopascals and at a flow rate of 217 cubic meters per second through an internally piped primary coolant flowpath 18. This coolant is passed through a central opening in spindle 20.

A low pressure pump 22 delivers coolant at a pressure of 240 kilopascals and at a flow rate of 3.6 cubic meters per second through a secondary coolant flowpath 24 internally piped to a static flow connector 26.

The tool changer 28 is operable to remove tools 30 from tool storage and insert them within spindle 20. Tool holder 32 is shown installed within spindle 20.

Tool holder 32 includes a static holder portion 34 and rotary portion 36. The rotary portion is rotatably mounted in the static holder portion with bearings 38. The rotary portion is suitable for mounting in drive spindle 20 and also has a holder primary flowpath 40 through the center of the rotary portion. When installed, this flowpath 40 is in fluid communication with primary coolant flowpath 18.

The tool guard assembly 42 is secured to the tool holder at interface 44. The holder primary flowpath 40 through the rotating rotary portion is in communication with annular space 46 and flowpath 48 in the static holder portion. Flow passes outwardly through annular space 50 entering a primary guard flowpath 52 in the guard assembly.

Sleeve 54 is biased by spring 56 and with the tool holder installed is forced against a seal and static flow connector 26 of the machining center. This static flow connector not only passes secondary coolant flow from secondary coolant path 24 to holder secondary flowpath 58 within the sleeve, but also operates as stop block to prevent rotation of the static tool holder portion.

The holder secondary flowpath 58 is in fluid communication with the interior of sleeve 60 of the guard assembly with the secondary coolant flow passing to a secondary guard flowpath 62 within the guard assembly.

Circle 66 indicates an imaginary circle representing a potential grinding wheel and also is representative of the outer edge of an installed superabrasive grinding wheel. Arcuate frame 64 of the guard assembly 42 surrounds wheel 66 through an arcuate portion. Within this frame secondary flowpath 62 continues through flowpath 68 to a cleaning nozzle 70. This cleaning nozzle 70 includes an orifice plate 72 which forms a flat or fan shaped spray covering the width of the grinding wheel 66 directing fluid along centerline 74 which is 30 degrees from line 76 representing the radial direction of the grinding wheel or imaginary circle 66. This spray is directed upwardly toward the direction of rotation 78.

A second cleaning nozzle 80 is supplied through a secondary flowpath 82 in parallel flow relationship with cleaning nozzle 70.

The secondary flowpath 62 may also include an additional parallel flowpath 84 supplying coolant to flood nozzle 86. This nozzle is supported on an adjustable articular line 88. This permits the flood nozzle to be directed toward the location where the grinding wheel exits the workpiece thereby supplying coolant not only to the grinding wheel, but also to the workpiece. The flexible connection would permit this nozzle to be pushed out of the way should there be any interference with the workpiece.

The arcuate frame 64 also includes as a portion thereof an adjustable arcuate member 90 slideably secured by bolt 92 to the other portion of the arcuate frame. Secured to this adjustable portion is coolant nozzle 94 with flow directed along centerline 96 tangentially to circle 66. A wheel of 20 cm in diameter rotating up to 6000 RPM produces a surface velocity of up to 41 meters per second. With 2.7 cubic meters for second of coolant being supplied, the flow area of the nozzle to match the surface velocity is 2.5 square centimeters.

Primary coolant entering through annular space 50 passes through primary guard path 52 into and through telescoping connector 98. It thus continues through the adjustable portion of the frame to nozzle 94.

Figure 2:
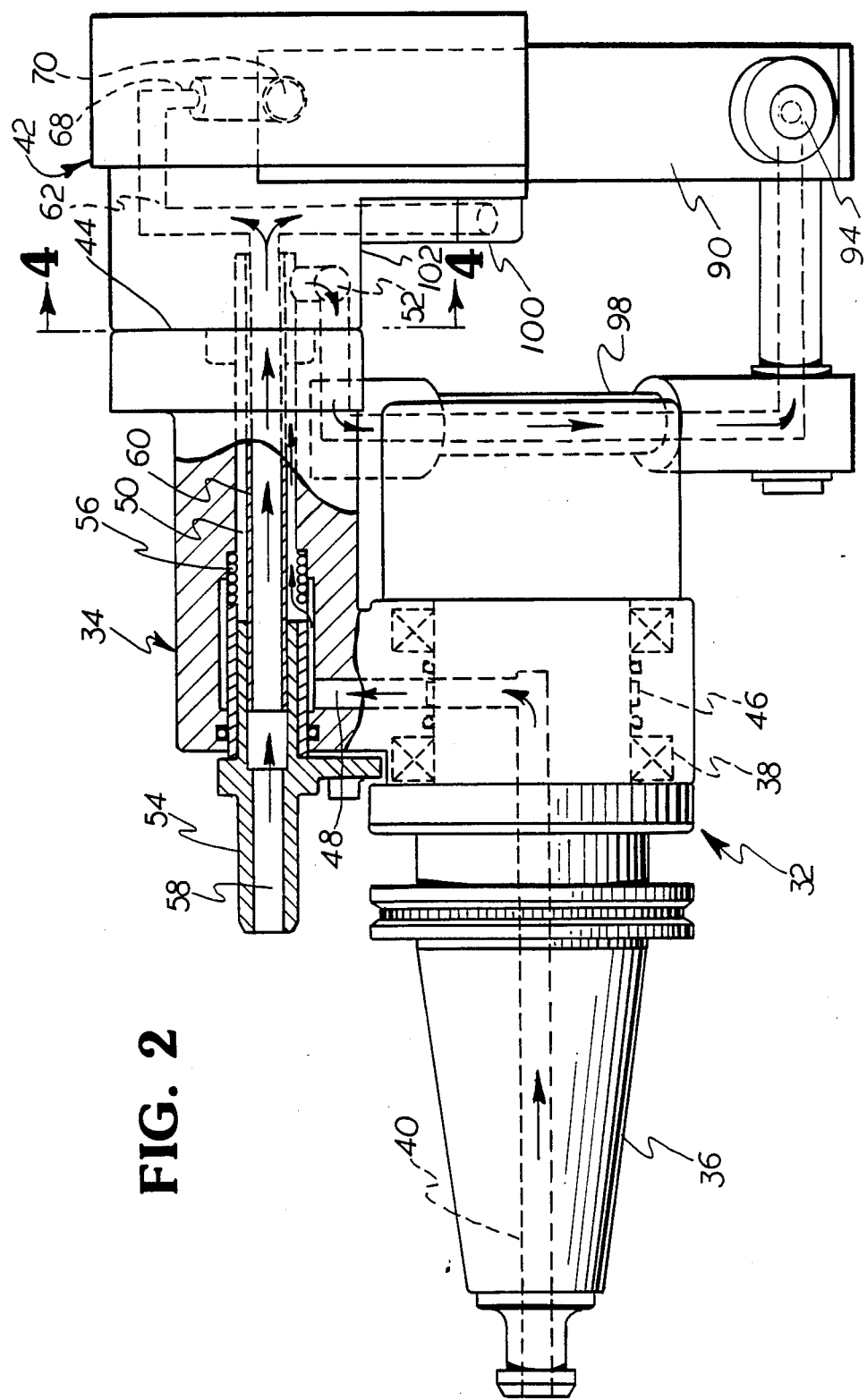
FIG. 2 is a side elevation in partial section of the tool holder and guard assembly.

FIG. 4 is a view taken through section 4—4 of FIG. 2. This view better illustrates bosses 100 and 102 which facilitate installation of the necessary flowpaths.

Figure 3:
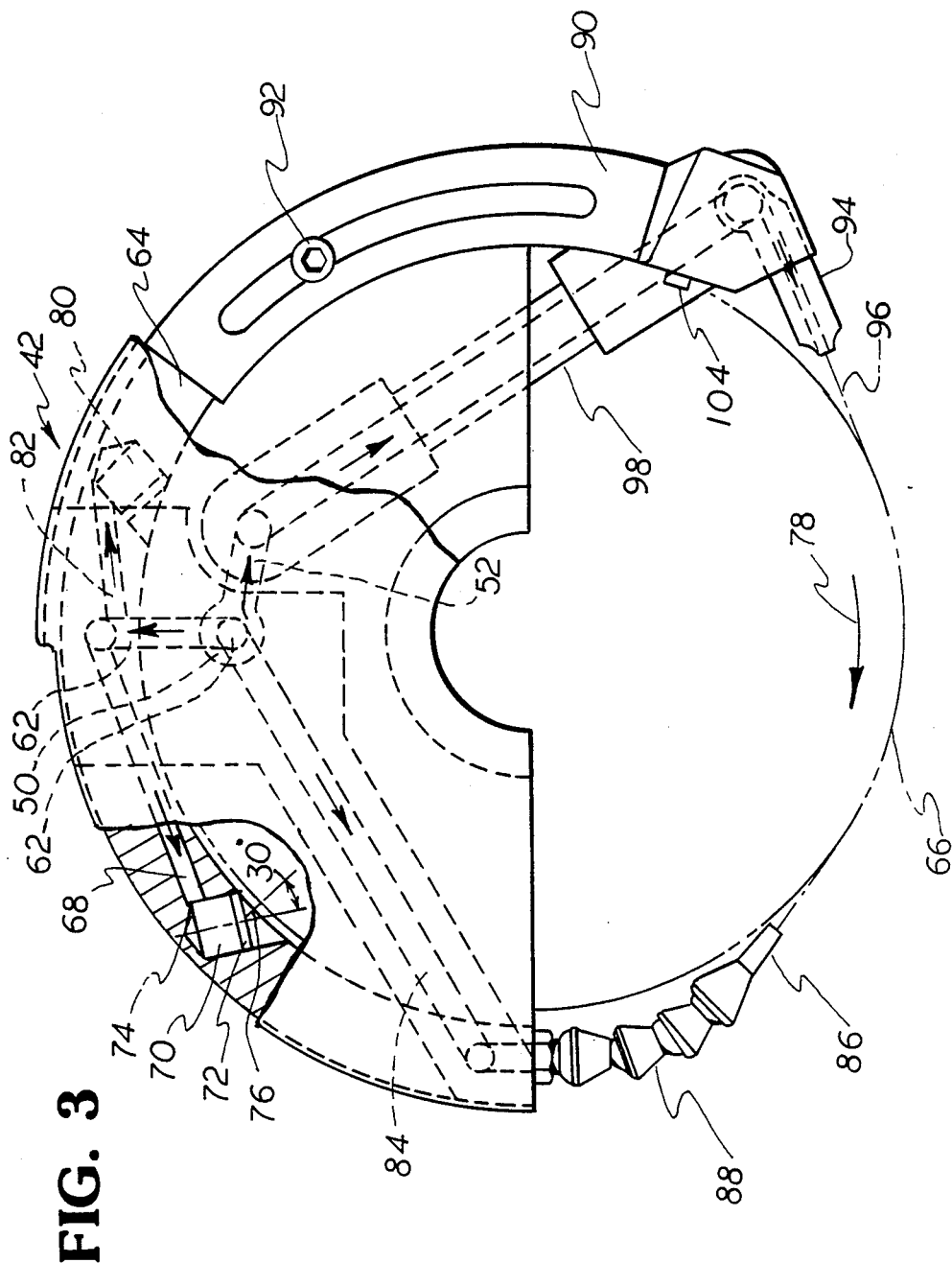
FIG. 3 is an end view of the guard assembly.

Referring to FIG. 3, windbreaker 104 is located on the guard frame. This windbreaker extends inwardly to the location of wheel 66. It is intended that this breaker actually touch the wheel and it will be thereby ground back to minimum clearance. The windbreaker is located immediately upstream, with respect to the direction of of rotation, of cooling nozzle 94. As the grinding wheel rotates, air is dragged along its surface. This windbreaker strips the air from the surface thereby permitting more intimate contact between the spray from cooling nozzle 94 and the wheel.

Depending upon the depth of cut required, the adjustable portion of the arcuate frame is relocated bringing nozzle 94 upwardly. It can be seen that as this nozzle passes in an arc with the guide it remains directly tangential to the cutting wheel.

In operation of the machining center, the tool changing apparatus 28 will select the grinding wheel tool holder and place it within spindle 20. The primary flowpath will automatically be connected through the spindle and rotary portion while the secondary flowpath will be connected automatically through the static connection 26. With a known grinding wheel already installed, nozzles 94 and 86 will already be appropriately located. Accordingly, the setup is quick, precise, and repeatable. The nozzles are located as required for the particular coolant. This coolant may not be the optimum selection for grinding since it also must be used for other operations, the nozzles can be ideally set up to do the best job for the particular coolant. There are no dangling lines or hoses to interfere or get caught in the workpiece. Only articulated line 88 is readily movable, this is not essential to the operation, and any contact will only push the line out of the way.

Pressures and flow may be adjusted externally by manipulation of pumps 16, 22, or by throttling of the discharge lines from the pumps.

We claim:

1. A grinding wheel apparatus comprising:
   a machining center including a drive spindle for receiving a tool holder, and having a flow hole through the centerline thereof;
   a primary pump for circulating primary coolant;
   a secondary pump for circulating a secondary coolant;
   a static flow connector located adjacent to said spindle;
   a primary coolant flowpath from said pump to said hole through the centerline of said spindle;
   a secondary coolant path from said secondary pump to said static flow connector;
   a tool holder including a static holder portion and a rotary portion;
   said rotary portion securable in said drive spindle and rotatably mounted in said static holder portion, and suitable for mounting an arbor supported superabrasive grinding wheel therein;
   a holder primary flowpath entering said rotary portion through the centerline thereof, and in fluid communication with said primary coolant path, and exiting through said static holder portion;
   a holder secondary flowpath entering and exiting said static holder portion;
   a guard assembly, secured to said static tool holder portion including an arcuate frame surrounding an imaginary circle representing a potential grinding wheel;
   a primary guard flowpath through said arcuate frame in fluid communication with one of said holder flowpaths;
   said arcuate frame also including a secondary guard flowpath through said frame in fluid communication with the other of said holder flowpaths;
   a cooling nozzle located at one arcuate end of said frame and arranged to discharge coolant tangential to said imaginary circle;
   said primary guard path in fluid communication with said cooling nozzle;
   at least one cleaning nozzle oriented substantially 30 degrees from the radial direction of said imaginary circle; and
   said secondary guard flowpath arranged to discharge coolant through said cleaning nozzles.

2. An apparatus as in claim 1:
   said primary guard flowpath in fluid communication with said holder primary path; and
   said secondary guard flowpath in fluid communication with said holder secondary path.

3. An apparatus as in claim 2:
said primary pump being a high pressure pump and said secondary pump being a low pressure pump.

4. An apparatus as in claim 3:
said high pressure pump discharging coolant between 1500 and 3000 kilopascals and said secondary kilopascals.

5. An apparatus as in claim 1:
a plurality of cleaning nozzles; and
said secondary guard path arranged to discharge coolant in parallel flow relationship through said plurality of cleaning nozzles.

6. An apparatus as in claim 1:
said secondary guard path also including a flood nozzle adjustably affixed to said arcuate frame, and moveable to direct flow toward said imaginary circle at a location where an installed grinding wheel would exit a workpiece; and
a flood nozzle path in parallel flow relationship with said cleaning nozzles.

7. An apparatus as in claim 1:
said arcuate frame having a windbreaker secured to the inner edge of said arcuate frame near one arcuate edge thereof, and extending inwardly to substantially imaginary circle; and
said windbreaker also located near said coolant nozzle, whereby wheel generated airflow will be stripped from the grinding wheel immediately before the discharge of coolant through said coolant nozzle on such grinding wheel.

8. An apparatus as in claim 1:
said cleaning nozzles comprising flat spray nozzles with a longitudinal flat portion oriented transverse to said imaginary circle.

9. An apparatus as in claim 1:
said rotary portion having a speed of rotation;
a superabrasive grinding wheel secured in said rotary portion having as a diameter that of said imaginary circle, and therefore having a surface velocity that is out of periphery; and
said cooling nozzle having a discharge flow area selected in conjunction with the flow through said primary card path to produce a flow velocity substantially equal to said surface velocity.

10. An apparatus as in claim 5:
said secondary guard path also including a flood nozzle adjustably affixed to said arcuate frame, and moveable to direct flow toward said imaginary circle at a location where an installed grinding wheel would exit a workpiece; and
a flood nozzle path in parallel flow relationship with said cleaning nozzles.

11. An apparatus as in claim 10:
said arcuate frame having a windbreaker secured to the inner edge of said arcuate frame near one arcuate edge thereof, and extending inwardly to substantially imaginary circle; and
said windbreaker also located near said coolant nozzle, whereby wheel generated airflow will be stripped from the grinding wheel immediately before the discharge of coolant through said coolant nozzle on such grinding wheel.

12. An apparatus as in claim 4:
a plurality of cleaning nozzles;
said secondary guard path arranged to discharge coolant in parallel flow relationship through said plurality of cleaning nozzles;
said secondary guard path also including a flood nozzle adjustably affixed to said arcuate frame, and moveable to direct flow toward said imaginary circle at a location where an installed grinding wheel would exit a workpiece;
a flood nozzle path in parallel flow relationship with said cleaning nozzles;
said arcuate frame having a windbreaker secured to the inner edge of said arcuate frame near one arcuate edge thereof, and extending inwardly to substantially imaginary circle;
said windbreaker also located near said coolant nozzle, whereby wheel generated airflow will be stripped from the grinding wheel immediately before the discharge of coolant through said coolant nozzle on such grinding wheel;
said cleaning nozzles comprising flat spray nozzles with a longitudinal flat portion oriented transverse to said imaginary circle;
said rotating portion having a speed of rotation;
a superabrasive grinding wheel secured in said rotating portion having as a diameter that of said imaginary circle, and therefore having a surface velocity that is out of periphery; and
said cooling nozzle having a discharge flow area selected in conjunction with the flow through said primary card path to produce a flow velocity substantially equal to said surface velocity.

13. A tool holder for a grinding wheel for use in a machining center including a drive spindle for receiving the tool holder, and having a flow hole through the centerline thereof, a primary pump for circulating primary coolant, a secondary pump for circulating a secondary coolant, a static flow connector located adjacent to said spindle, a primary coolant flowpath from said pump to said hole through the centerline of said spindle, a secondary coolant path from said secondary pump to said static flow connector, comprising:
a static tool holder portion;
a rotary holder portion;
said rotary holder portion securable in said drive spindle and rotatably mounted in said static holder portion, and suitable for mounting an arbor supported superabrasive grinding wheel therein;
a holder primary flowpath entering said rotary holder portion through the centerline thereof, and in fluid communication with said primary coolant path, and exiting through said static holder portion;
a holder secondary flowpath entering and exiting said static holder portion;
a guard assembly, secured to said static tool holder portion including an arcuate frame surrounding an imaginary circle representing a potential grinding wheel;
a primary guard flowpath through said arcuate frame in fluid communication with one of said holder flowpaths;
said arcuate frame also including a secondary guard flowpath through said frame in fluid communication with the other of said holder flowpaths;
a cooling nozzle located at one arcuate end of said frame and arranged to discharge coolant tangential to said imaginary circle;
said primary guard path in fluid communication with said cooling nozzle;
at least one cleaning nozzle oriented substantially 30 degrees from the radial direction of said imaginary circle; and said secondary guard flowpath arranged to discharge coolant through said cleaning nozzles.

14. An apparatus as in claim 13:

a plurality of cleaning nozzles; and said secondary guard path arranged to discharge coolant in parallel flow relationship through said plurality of cleaning nozzles.

15. An apparatus as in claim 13:

said secondary guard path also including a flood nozzle adjustably affixed to said arcuate frame, and moveable to direct flow toward said imaginary circle at a location where an installed grinding wheel would exit a workpiece; and a flood nozzle path in parallel flow relationship with said cleaning nozzles.

16. An apparatus as in claim 13:

said arcuate frame having a windbreaker secured to the inner edge of said arcuate frame near one arcuate edge thereof, and extending inwardly to substantially imaginary circle; and said windbreaker also located near said coolant nozzle, whereby wheel generated airflow will be stripped from the grinding wheel immediately before the discharge of coolant through said coolant nozzle on such grinding wheel.

17. An apparatus as in claim 15:

said arcuate frame having a windbreaker secured to the inner edge of said arcuate frame near one arcuate edge thereof, and extending inwardly to substantially imaginary circle;

said windbreaker also located near said coolant nozzle, whereby wheel generated airflow will be stripped from the grinding wheel immediately before the discharge of coolant through said coolant nozzle on such grinding wheel; and said cleaning nozzles comprising flat spray nozzles with a longitudinal flat portion oriented transverse to said imaginary circle.

* * * * *

UNITED STATES PATENT AND TRADEMARK OFFICE
CERTIFICATE OF CORRECTION

PATENT NO.   : 4,929,130

DATED        : May 29, 1990

INVENTOR(S)  : Richard A. Diebolt, Stephen Kidd, Donald E. Rivers, Jr.

It is certified that error appears in the above-identified patent and that said Letters Patent is hereby corrected as shown below:

Claim 4, column 5, line 7, before "kilopascals" insert
-- pump discharging coolant between 150 and 300 --

Signed and Sealed this

Second Day of June, 1992

Attest:

DOUGLAS B. COMER

Attesting Officer

Acting Commissioner of Patents and Trademarks